US012342129B2

(12) United States Patent
Berl et al.

(10) Patent No.: US 12,342,129 B2
(45) Date of Patent: Jun. 24, 2025

(54) ELECTROMAGNETIC SIGNAL CONVERTER FOR A BONE CONDUCTION RECEIVER

(71) Applicant: BHM-Tech Produktionsgesellschaft m.b.H., Grafenschachen (AT)

(72) Inventors: Franz Berl, Unterstinkenbrunn (AT); Klaus Hostniker, Vasoldsberg (AT); Markus Riegler, Grafendorf bei Hartberg (AT)

(73) Assignee: BHM-Tech Produktionsgesellschaft m.b.H., Grafenschachen (AT)

( * ) Notice: Subject to any disclaimer, the term of this patent is extended or adjusted under 35 U.S.C. 154(b) by 0 days.

(21) Appl. No.: 18/037,588

(22) PCT Filed: Dec. 14, 2020

(86) PCT No.: PCT/EP2020/086043
§ 371 (c)(1),
(2) Date: May 18, 2023

(87) PCT Pub. No.: WO2022/128063
PCT Pub. Date: Jun. 23, 2022

(65) Prior Publication Data
US 2024/0348986 A1 Oct. 17, 2024

(51) Int. Cl.
*H04R 11/02* (2006.01)
*H04R 25/00* (2006.01)

(52) U.S. Cl.
CPC ............ *H04R 11/02* (2013.01); *H04R 25/606* (2013.01)

(58) Field of Classification Search
CPC .............................. H04R 11/02; H04R 25/606
See application file for complete search history.

(56) References Cited

U.S. PATENT DOCUMENTS

| | | | |
|---|---|---|---|
| 9,699,566 | B2 | 7/2017 | Jurisch et al. |
| 2003/0034705 | A1 | 2/2003 | Hakansson |
| 2006/0045298 | A1 | 3/2006 | Westerkull |

FOREIGN PATENT DOCUMENTS

| | | | | |
|---|---|---|---|---|
| EP | 2609758 | B1 * | 12/2015 | ............. H04R 11/02 |
| EP | 3 065 420 | A1 | 9/2016 | |

OTHER PUBLICATIONS

International Search Report in PCT/EP2020/086043, mailed Sep. 21, 2021.

(Continued)

*Primary Examiner* — Sunita Joshi
(74) *Attorney, Agent, or Firm* — Collard & Roe, P.C.

(57) ABSTRACT

An electromagnetic signal converter for a bone conduction receiver includes a soft-magnetic armature which is moveable relative to a pole that supports an electric coil, a permanent magnet, and a soft-magnetic yoke which forms a magnetic circuit with the permanent magnet, the pole, and the armature. First and second poles are provided, each having an electric coil. Both poles have an identical design and are arranged symmetrically on a common pole axis. The armature is arranged between the two poles, forming an axial working air gap. The permanent magnet is magnetized perpendicularly to the pole axis and is arranged radially outside of the armature, and the armature lateral surface facing the permanent magnet forms a radial air gap, via which the armature is magnetically coupled to the permanent magnet. The axial thickness of the permanent magnet is equal to or greater than the axial distance between the two poles.

9 Claims, 2 Drawing Sheets

(56) References Cited

OTHER PUBLICATIONS

Hakansson, Bo E. V., "The balanced electromagnetic separation transducer. A new bone conduction transducer", The Journal of the Acoustical Society of America, American Institute of Physics for the Acoustical Society of America, New York, NY, US, 113 (2), Feb. 1, 2003, pp. 818-825, XP012003310, total of 9 pages.

* cited by examiner

ELECTROMAGNETIC SIGNAL CONVERTER FOR A BONE CONDUCTION RECEIVER

CROSS REFERENCE TO RELATED APPLICATIONS

This application is the National Stage of PCT/EP2020/086043 filed on Dec. 14, 2020, the disclosure of which is incorporated by reference. The international application under PCT article 21 (2) was not published in English.

BACKGROUND OF THE INVENTION

The invention relates to an electromagnetic signal converter for a bone conduction receiver, comprising at least one soft-magnetic armature which is movable relative to a pole that supports at least one electric coil, at least one permanent magnet for generating a magnetic bias of the armature, as well as at least one soft-magnetic yoke, which forms at least one magnetic circuit together with the at least one permanent magnet, the at least one pole and the at least one armature.

The electromagnetic signal converter is intended for use in particular in a bone conduction receiver of a diagnostic device, but also in hearing and communication systems.

DESCRIPTION OF THE PRIOR ART

Bone conduction receivers, as known from the prior art, convert electrical signals into mechanical vibrations and therefore act as electromagnetic signal converters and vibration generators. This technology is used, among other things, in hearing aids and is particularly suitable for people with impairment of the outer and middle ear, since in this case the sound cannot be transmitted as airborne sound to the eardrum and from there by solid-state conduction via the incus and stapes to the cochlea. The acoustic signal to be transmitted to the human is created as an electrical signal or converted from an acoustic signal to an electrical signal, e.g., by recording it through a microphone. As a rule, the electrical signal is amplified, processed and passed on to the electromagnetic signal converter. In the signal converter, the electrical signals are fed to the at least one coil, which causes the armature to oscillate accordingly. The oscillator serving as the armature contacts the human body, e.g. at the location of the skull bone, wherein the acoustic signal in the form of tactile vibrations is transmitted directly to the inner ear, bypassing the middle ear, where it is converted into a nerve stimulus in the cochlea.

High force densities can be achieved with small air gaps, i.e. working air gaps between the armature and the pole, with low electrical excitation using the reluctance principle. According to this, the force F on the armature is proportional to the square of the air gap induction, and thus depends quadratically on the current with which the coil is supplied. This quadratic dependence implies a frequency doubling of the force component for a sinusoidal oscillation of the magnetic field. Thus, a signal-true mapping is not given. In addition, the oscillating movements also change the working air gap and the transmission behavior is distorted even further.

By magnetically biasing the armature, where by means of one or more permanent magnets a static magnetic field is generated which is superimposed on the dynamic electrically generated field, signal proportionality can be established under certain boundary conditions. With a solution according to EP 3065420 A1, the magnetic resistance and the current consumption have been drastically reduced by the use of highly coercive permanent magnets and thus low magnet heights as well as the creation of bypass paths for the electrodynamic excitation, but the basic problems of distortion factor and self-adhesion of the armature remain.

The signal converter of US 2003/0034705 A1 also incorporates the principle of superimposing static and dynamic magnetic fluxes in the sense of proportional electromagnetic signal conversion, but with several working air gaps being provided and the magnetic fluxes being in the same direction in one part of the working air gaps and in opposite directions in another part. In addition, the signal converter of US 2003/0034705 A1 has a different mechanical structure compared with EP 3065420 A1 in that, on the one hand, an adapter yoke, a coil former and a coil are connected to each other and act as an armature, and can oscillate with respect to a unit consisting of a permanent magnet, a yoke, a bottom plate, a rod and a counter mass. Therefore, US 2003/0034705 A1 does not have an armature that is movable relative to the coil.

The permanent magnet flux creates a reluctance force in the direction of a decreasing magnetic resistance. In some embodiments of US 2003/0034705 A1, this reluctance force is compensated by a spring force. In the double-gap systems shown in FIGS. 4 and 5 of US 2003/0034705 A1, no reluctance force occurs when the component acting as the armature is in a symmetrical position. However, this operating point is unstable. As soon as a deflection occurs, a reluctance force also acts in the same direction as this deflection and must be compensated by a spring force. This reluctance force results from the reduction of the total magnetic resistance during deflection, since the magnetic resistance decrease (magnetic conductance increase) in the closing working air gap is greater than the resistance increase of the opening working air gap. The magnetic energy increases and a force is generated. However, this increase in reluctance force with displacement is not linear and can be described in a good approximation by a third degree polynomial. The greater the working point shift of the permanent magnets in the direction of increase of the working induction, the greater the reluctance force becomes. The embodiments according to US 2003/0034705 A1 exhibit particularly strong magnetic conductance changes and thus nonlinear reluctance forces because the permanent flux not only closes as drawn in US 2003/0034705 A1, but also feeds a secondary path of higher magnetic conductivity through this type of arrangement of the permanent magnets and the air gaps to the armature, which generates the electromagnetic flux with its coil.

With the high demands of a low distortion factor in a diagnostic device, a nonlinearity in the deflection is not tolerable. One would have to counteract with a progressive spring characteristic curve to compensate for this nonlinearity. This is very complex.

But not only the low distortion factor is relevant, but also the intensity of the oscillation (this requires a certain spring stiffness between the armature and the oscillating mass) and the correct resonance frequencies, which result from the spring constant and the oscillating mass. It is necessary to make the oscillating mass of the system as large as possible.

Since the signal fidelity of bone conduction receivers is the top priority in diagnostic technology, power consumption is of secondary importance, since these devices are usually mains-powered or there is sufficient space for large batteries.

OBJECT OF THE INVENTION

Therefore, it is an object of the present invention to overcome the disadvantages of the prior art and to find an electromagnetic signal converter, especially but not only for diagnostic purposes, which leads to less large working point shifts at the permanent magnet (changes in the magnetic conductance) when the armature is deflected, thereby keeping the reluctance force, and thus also the nonlinearity of the reluctance force, small.

SUMMARY OF THE INVENTION

This object is solved by an electromagnetic signal converter according to claim 1. The starting point of the invention is an electromagnetic signal converter for a bone conduction receiver, comprising

- at least one soft-magnetic armature which is movable relative to a pole that supports at least one electric coil,
- at least one permanent magnet for generating a magnetic bias of the armature, as well as
- at least one soft-magnetic yoke, which forms at least one magnetic circuit together with the at least one permanent magnet, the at least one pole and the at least one armature.

In this context, it is provided

- that at least one first and one second pole are provided, each of which carries at least one electric coil, wherein the two poles are identical in design and are arranged symmetrically with respect to one another on a common pole axis,
- that at least one armature is arranged between at least two poles which are arranged symmetrically with respect to one another, thereby forming in each case an axial working air gap, and is movable along the pole axis relative to the poles,
- that the at least one permanent magnet is magnetized perpendicularly to the pole axis and is arranged radially outside the at least one armature,
- that the lateral surface of the at least one armature facing the at least one permanent magnet forms a radial air gap, via which the armature is magnetically coupled to the permanent magnet, wherein the axial thickness of the permanent magnet is equal to or greater than the axial distance between the two poles.

In this way, the axial thickness of the permanent magnet is in any case greater than the axial thickness of the armature between the poles, so that when the armature moves along the pole axis, at least the part of the armature located between the poles, usually the largest part of the armature, is always covered by the permanent magnet in the axial direction. Due to the resulting protrusion of the permanent magnet relative to the armature and due to the magnetic field of the permanent magnet now extending perpendicularly to the pole axis, and thus transversely to the movement of the armature, the armature experiences fewer magnetic flux fluctuations during its movement; there are fewer large operating point shifts at the permanent magnet, the reluctance force, and thus also the nonlinearity of the reluctance force, is reduced.

Depending on the width of the radial air gap and the maximum deflection of the armature, the overlap of armature and permanent magnet in the axial direction generates a centering force on the armature which counteracts and at least partially compensates the reluctance force. The width of the radial air gap remains constant even if the armature moves relative to the permanent magnet or magnets.

This ensures a high constancy of the magnetic flux of the permanent magnet(s), i.e. a low deflection dependence of the magnetic field of the permanent magnet(s) on the armature. At the same time, the design of the signal converter according to the invention has a low magnetic resistance in the electromagnetically excited flux path, thus resulting in a high force/current constant.

Regarding the terms used: A radial air gap has a length in the direction of the pole axis corresponding to the greatest extension of the air gap area, and a width resulting from the distance between the lateral surface of the armature and the adjacent permanent magnet, more precisely its pole face, wherein the width is measured in the radial direction to the pole axis. The term thickness (or height) means the axial thickness (or axial height), i.e. the thickness (or height) measured in the direction of the pole axis, axial distance means the distance measured in the direction of the pole axis. The axial thickness of the permanent magnet, referred here to the structure of the signal converter, is otherwise usually referred to, in relation to the permanent magnet, as the width of the permanent magnet, because the length and width of a permanent magnet form its pole area, and the thickness is otherwise actually referred to, again in relation to the permanent magnet, as the magnet height, which is measured in the direction of magnetization.

The pole faces of the poles facing towards the armature have surface normals (=pole axes) which face in the direction of dimension of the width of the working air gap and thus lie in the direction of motion.

The armature has at least two pole faces which are disposed parallel to each other and at least one lateral surface which is usually normal to the pole faces of the armature. The pole face of the permanent magnet(s) facing inwards towards the armature is opposite the lateral surface of the armature and forms a radial air gap.

In longitudinal section, i.e. in a section parallel to the pole axis, the lateral surface of the armature will generally have a straight course parallel to the pole axis. Likewise, the pole face of the permanent magnet, which is adjacent to the lateral surface of the armature and forms the radial air gap with the latter, will run parallel to the pole axis and thus parallel to the lateral surface of the armature. Thus, the radial air gap between the armature surface and the pole face of the permanent magnet has a constant width along the pole axis.

The magnetic flux generated by means of permanent magnet(s) closes in a first magnetic circuit via the armature, via a working air gap between armature and one pole, via this pole and via the soft-magnetic yoke. The second magnetic circuit closes via the armature, via the other working air gap between the armature and the other pole, via the other pole and via the soft-magnetic yoke.

The armature is formed symmetrically to a plane which is normal to the pole axis. The permanent magnet(s) are also formed symmetrically to this plane. When the armature is at rest, where no movement is induced by the coils, it is held by a suspension so that the first and second working air gaps are equal.

In its simplest form, the signal converter according to the invention has an armature surrounded by one or more permanent magnets.

The armature is arranged between two similar poles that are symmetrical to each other. A soft-magnetic yoke closes the two magnetic circuits. The armature and poles and permanent magnets can be designed rotationally symmetrical about the pole axis. The permanent magnet or magnets would then be ring-shaped or would together form a ring shape.

The armature could also be rectangular—as seen in the direction of the pole axis. In this case, permanent magnets, e.g. bar magnets, would be arranged on at least two sides of the armature extending parallel to each other, in particular on the broad sides, namely parallel to each other in a plane normal to the pole axis, so that the radial air gap between the armature and the permanent magnets is the same in each case. The bar magnet would then be at least as long as the corresponding side of the rectangle. Preferably, a single bar magnet is used per side. Also conceivable as a special case of the rectangular armature would be a square armature, in which case, while maintaining a constant radial gap, either bar magnets are provided for each side of the square, preferably one bar magnet per side of the square, which is at least as long as one side of the square armature, or again bar magnets are provided only for two parallel sides of the square, preferably one bar magnet per side of the square, which is at least as long as one side of the square armature. In general, the armature may have the shape of a regular n-square surrounded by n bar magnets corresponding to one side length of the n-square, maintaining a constant radial gap. The poles and coils are usually designed rotationally symmetrical about the pole axis independently of the shape of the armature.

The pole for an armature can be composed of several partial poles with their own coils, e.g. instead of one pole four partial poles could be provided covering a rectangular armature. It would also be conceivable to subdivide the armature into several partial armatures. The coil of a pole can be constructed from several, in particular similar, partial coils.

However, the signal converter according to the invention can also comprise several units, each composed of an armature, two poles and surrounding arrangement of permanent magnets as well as a soft-magnetic yoke. These units can be located one behind the other along a common pole axis. And/or these units can be located next to each other, each with its own pole axis.

In order to obtain the largest possible oscillating mass, it is preferably provided that the at least one armature belongs to a fixed part of the signal converter, in particular is fixedly connected to a housing surrounding the magnetic circuit, while the at least two poles, the at least two coils, the at least one permanent magnet and the at least one soft-magnetic yoke are fixedly connected to each other and form the, relative to the armature, oscillating mass of the signal converter.

In its simplest form, the signal converter according to the invention then has an armature fixedly connected to a housing and an oscillating mass comprising the two poles, the coils of the poles, the permanent magnet(s) surrounding the armature, and a soft-magnetic yoke.

Only the armature, for example in the form of an armature plate, is firmly connected to the housing via which the oscillations are transmitted to the human body. All other active components, such as permanent magnets, soft-magnetic yoke, poles including the coil, belong to the oscillating mass, which oscillates relative to the armature and the housing. In this way, the oscillating mass is maximized.

If the signal converter according to the invention comprises several units—each composed of an armature, two poles and surrounding arrangement of permanent magnets and a soft-magnetic yoke—on the one hand the armatures are connected to each other or all to one housing, just as on the other hand the oscillating masses are connected to each other to a common oscillating mass.

To further increase the oscillating mass, it may be provided that the oscillating mass contains at least one additional mass which is less magnetizable than the poles, the armature or the soft-magnetic yoke. The additional mass is not intended to play a role in the magnetic circuit, so that it could be non-magnetizable or at least less magnetizable than the magnetizable elements of the magnetic circuit.

As a rule, the fixed part of the signal converter is connected to the oscillating mass of the signal converter via spring elements. By means of the resilient elements, the armature is held between the two poles in the rest state in such a way that the first and second working air gaps are of equal size. Preferably, the armature is elastically connected to the oscillating mass via at least one spring, in particular a leaf spring. Preferably, one spring is provided axially outside the soft-magnetic yoke in each case, thus two springs in total. The armature is suspended from the spring(s), and the resonant frequency of the oscillating system is determined by the spring constant of the spring(s) and the oscillating mass.

The nonlinearity of the reluctance force is advantageously reduced if the largest extension of the armature measured radially to the pole axis is larger than the largest extension of the poles measured radially to the pole axis. In particular, the largest dimension of the armature measured radially to the pole axis can be larger than the largest dimension of the end face of the pole measured radially to the pole axis, i.e. the pole face facing the armature.

In one embodiment of the invention, it is provided that the armature is of plate-shaped design at least in the region radially inside the poles. Plate-shaped means that the end faces are flat and parallel to each other and that the distance between the end faces, i.e. the axial height or thickness of the armature, is smaller than its radial extension. The armature can also, if it extends radially beyond the poles, have the same height in this area as between the poles. Thus, the armature would then be entirely plate-shaped. The plate shape of the armature results in a flat design of the signal converter.

It is provided in one embodiment of the invention that the axial thickness of the armature expands radially outward of the poles toward the shell surface of the armature. This improves the magnetic coupling to the permanent magnet(s) and reduces the nonlinearity of the restoring force. This expansion is symmetrical in both directions of the pole axis.

It is provided in one embodiment of the invention that the poles are plate-shaped and have a recess for the coil, which is accommodated within the thickness of the plate. The pole then has a pole core that carries the coil, and a pole plate or pole shoe that does not carry a coil and faces the armature. Plate-shaped also means here that the end faces of the pole, also called pole faces, are flat and parallel to each other, and the distance between the end faces, i.e. the axial thickness of the pole, is smaller than its greatest radial extension. The plate shape of the yoke favors a low overall height of the signal converter.

It is provided in one embodiment of the invention that, as a soft-magnetic yoke, each pole has a plate-shaped cover which abuts the pole in the axial direction and covers it in the radial direction, as well as at least one wall which adjoins the covers, which encloses the pole with coil, the armature and the at least one permanent magnet radially outside and to which the at least one permanent magnet is attached. Thus, there are two covers and at least one common wall connecting the two covers. In particular, walls are provided—as viewed in the circumferential direction around the pole axis—at least where permanent magnets are located. In particular, the permanent magnets are recessed at or, radially completely or partially, in this wall. If, for example, there is a rectangular armature which has permanent magnets only on the broad sides of the rectangle, a wall could be provided only on one broad side of the armature in each case. The two covers and the two walls would then have the shape of a rectangular shell.

It is also conceivable that—as viewed in the circumferential direction around the pole axis—a closed circumferential wall is provided. In this way, the armature and the poles are in any case completely surrounded by soft magnetic material. The two covers and the circumferential wall would then have the shape of a hollow cylinder or a hollow cuboid, for example.

In order to ensure the connection of the permanent magnet or magnets to the at least one magnetic circuit and to keep the installation space small in radial direction, it can be provided that the at least one permanent magnet is arranged inside a recess of the wall. In particular, the at least one permanent magnet will be flush with the wall or the surfaces of the recess.

BRIEF DESCRIPTION OF THE DRAWINGS

The invention will now be explained in more detail by means of exemplary embodiments. The drawings are exemplary and are intended to illustrate the idea of the invention, but by no means to restrict it or even to reproduce it conclusively, wherein.

DETAILED DESCRIPTION OF THE PREFERRED EMBODIMENTS

Figure 1:
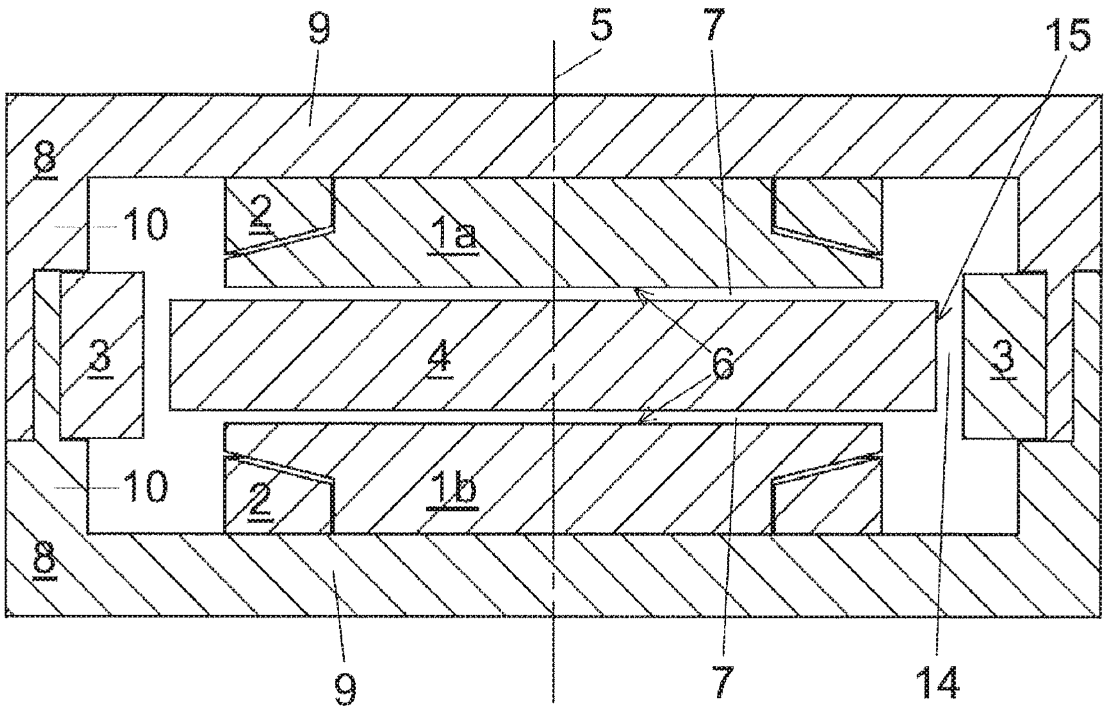
FIG. 1 shows a longitudinal section through a schematically illustrated signal converter according to the invention in a first embodiment.

The signal converter in FIG. 1 consists essentially of two identical poles 1*a*, 1*b*, each with an electric coil 2, two permanent magnets 3 in the form of cuboid magnets whose longitudinal direction is normal to the drawing plane, and a plate-shaped armature 4. The poles 1*a*, 1*b* and the coils 2 are designed in a rotationally symmetrical manner about the pole axis 5. The armature 4 is not designed in a rotationally symmetrical manner about the pole axis 5, but is rectangular in shape. Each pole 1*a*, 1*b* extends with its pole face 6 up to a working air gap 7 for the armature 4. The poles 1*a*, 1*b* are plate-shaped and have a recess of trapezoidal cross-section for a coil 2 on the end face facing away from the armature 4. It is understood that the poles 1*a*, 1*b* and the coils 2 can also be constructed differently.

In FIG. 1, the radial length of the armature 4 is greater than that of the poles 1*a*, 1*b*. The permanent magnets 3 are arranged in the radial direction at the same distance from the pole axis 5 and here—measured in the direction of the pole axis 5—are thicker or higher than the armature 4. The armature 4 is completely plate-shaped. The permanent magnets 3 are arranged radially outside the armature 4 with respect to the pole axis 5 and form with its lateral surface 15 (which is composed here of four rectangles) a radial air gap 14, via which the armature 4 is magnetically coupled to the permanent magnets 3, wherein the air gap 14 has a constant width over the height of the lateral surface 15 of the armature 4, both in a state in which no electrical signal is applied to the coils 2 and in a state in which an electrical signal is applied to the coils 2 and the armature 4 is deflected from its rest position.

In order to close the two magnetic circuits, a soft-magnetic yoke 8 is provided here, which consists of two similar U-shaped or bridge-shaped parts and is essentially formed as a cuboid casing. In other words, the soft-magnetic yoke 8 is composed of two plate-shaped covers 9 which abut in the axial direction on the pole 1*a*, 1*b* and here also on their coils 2 and cover the poles 1*a*, 1*b* in the radial direction, and of two flat straight walls 10 (shown on the left and right in FIG. 1) which adjoin both covers 9 and enclose the poles 1*a*, 1*b* with coils 2, the armature 4 and the permanent magnets 3. Parallel to the drawing plane, no walls 10 (and also no permanent magnets 3) are provided in this example, so the yoke 8 is open here. However, it would be conceivable that two walls 10 (with or without permanent magnets 3) are also provided parallel to the drawing plane, so that the yoke 8 would have the overall shape of a hollow cuboid.

A recess is provided on the inside of the wall 10, in which the permanent magnet 3 is fixed at least with its outer pole face.

The soft-magnetic yoke 8 can also be formed in two parts in other ways, for example by a cover 9 and the wall 10 forming a part in the form of a pot, onto which the other cover 9 is then placed.

The permanent magnets 3 are magnetized normal to the pole axis 5 and are designed, for example, as Sm2Co17 or NdFeB magnets. The poles 1*a*, 1*b* can be made of soft magnetic metal. The armature 4 and the soft-magnetic yoke 8 can be made of the same material as the poles 1*a*, 1*b*.

A housing which encloses all the parts of the signal converter mentioned and shown, protects against environmental influences and can be applied to the body of the patient to be examined is not shown here. The armature 4 is firmly connected to this housing and is resiliently connected to the oscillating mass of the signal converter so that it can move freely relative to the oscillating mass, i.e. relative to the poles 1*a*, 1*b* with coils 2, the permanent magnets 3 and the soft-magnetic yoke 8, along the pole axis 5. The poles 1*a*, 1*b*, the coils 2, the permanent magnets 3 and the soft-magnetic yoke 8 are firmly connected to one another and together form the oscillating mass. It is understood that additional masses 16 can also be arranged here on the oscillating mass, as shown in FIG. 3.

Figure 3:
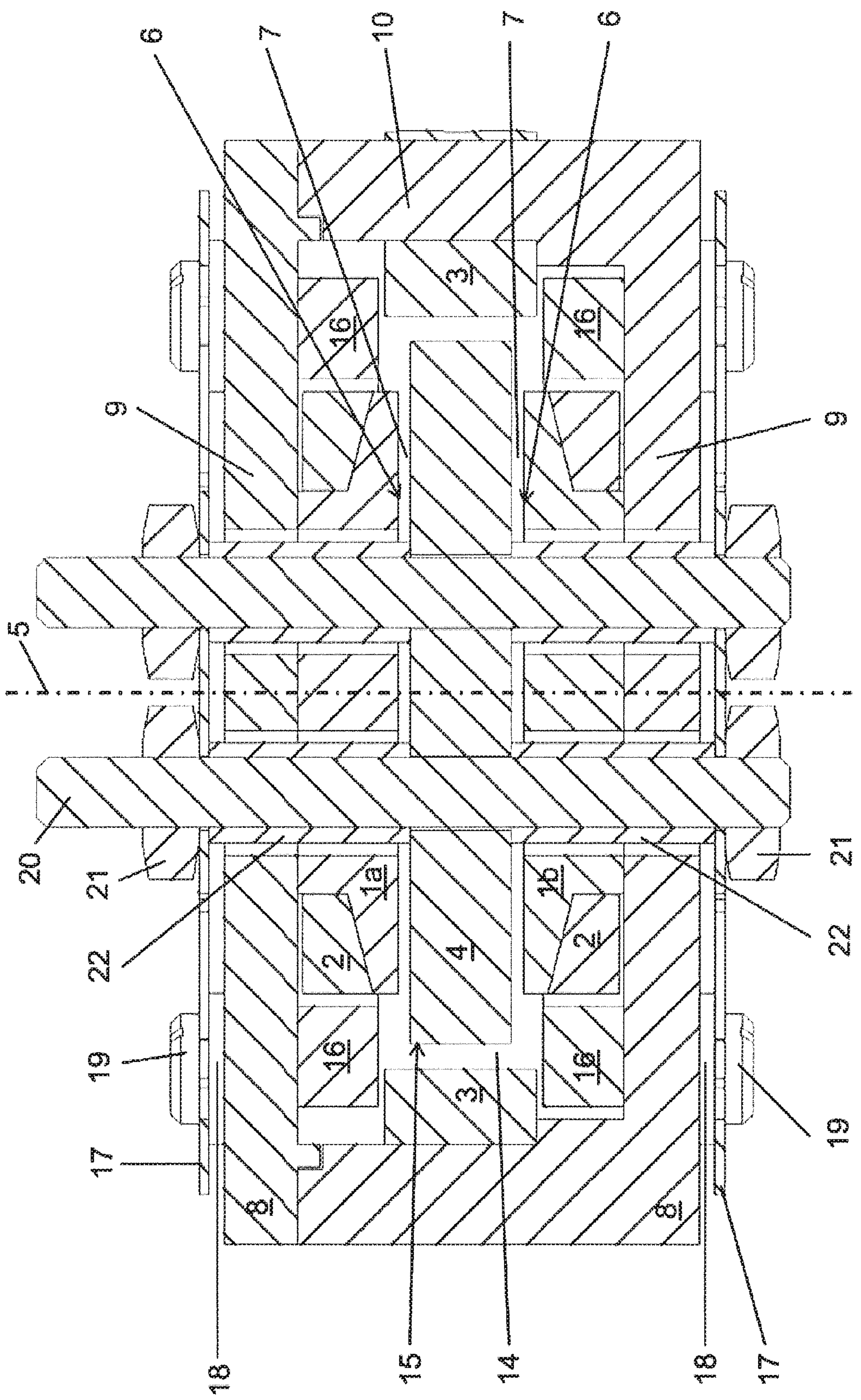
FIG. 3 shows a longitudinal section through a schematically illustrated signal converter according to the invention in a third embodiment.

The armature 4 is elastically connected to the oscillating mass via two leaf springs 17, which is not shown in FIG. 1 but can be taken from FIG. 3. The two working air gaps 7 are adjusted by the pretension of the leaf springs 17. The magnetic flux electrically excited by the coils 2 is superimposed on the permanent magnetic flux, which has the opposite direction in both working air gaps 7. For example, the magnetic flux goes from the armature 4 to the pole faces 6 of the poles 1*a*, 1*b*. The electrically excited magnetic flux runs along the pole axis 5 from top to bottom or vice versa. This reduces the magnetic flux in one working air gap 7 and increases it in the other working air gap 7. This results in different forces on the two sides and the armature 4 moves by reducing the working air gap 7 with the stronger magnetic flux. The movement of the armature 4 is transmitted to the human body via the housing, which is not shown.

Figure 2:
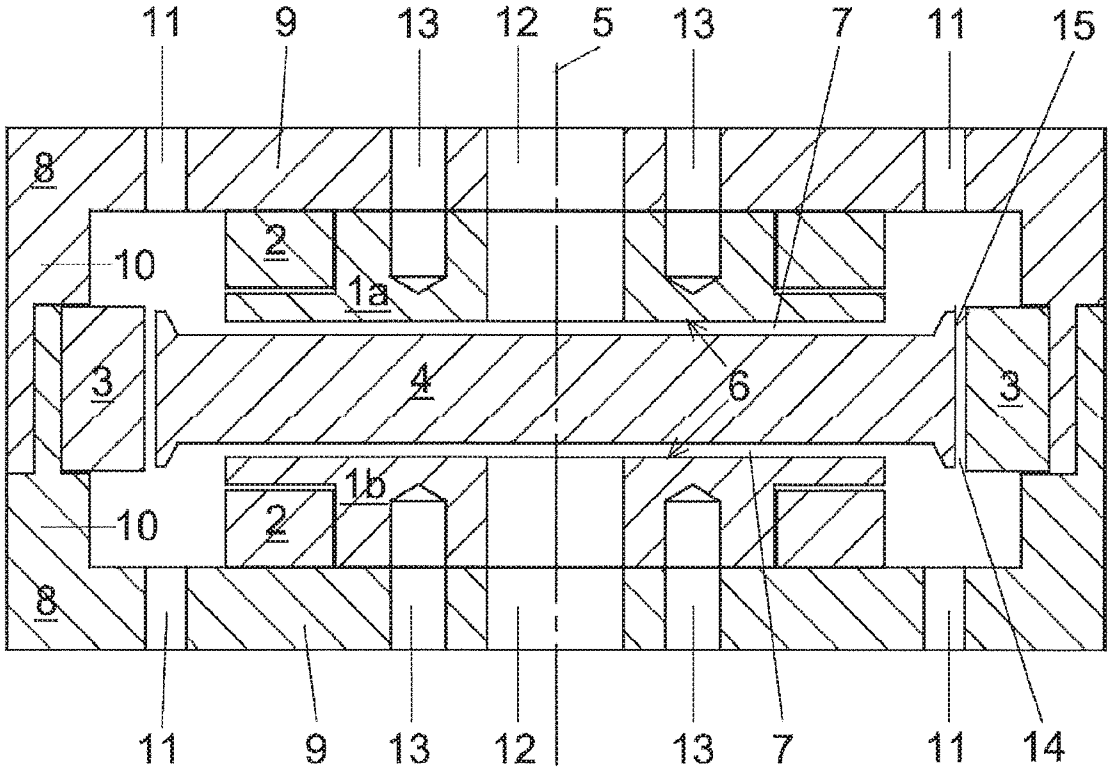
FIG. 2 shows a longitudinal section through a schematically illustrated signal converter according to the invention in a second embodiment.

The signal converter shown in FIG. 2 is very similar to the one in FIG. 1, so what has been said about FIG. 1 applies and only the differences are explained. In FIG. 2, the coils 2 are seated in recesses of rectangular cross-section in the poles 1*a*, 1*b*. However, the recesses for the coils 2 in FIGS. 1 and 2 are interchangeable.

In FIG. 2, the armature 4 is plate-shaped only between the poles 1*a*, 1*b*. Outside the poles 1*a*, 1*b*, the axial height or thickness of the armature 4 widens symmetrically in both directions of the pole axis 5, in this case by about one quarter of the height or thickness of the armature 4 between the poles 1*a*, 1*b*. The height of the shell surface 15 is preferably greater than the axial distance between the pole faces of the two poles 1*a*, 1*b*. However, the height of the shell surface 15 is preferably smaller than the axial thickness of the permanent magnets 3, or more precisely smaller than the axial dimension of the pole face of the permanent magnets 3 facing the armature 4. The shape of the armature 4 in FIGS. 1 and 2 are interchangeable.

Concentric around the pole axis 5, a bore 12 is provided through the poles 1*a*, 1*b*, the soft-magnetic yoke 8 as well as through the armature 4 itself in order to connect, e.g. screw, the armature 4 to the housing which is not shown. Furthermore, several smaller bores 13 are provided to screw the soft-magnetic yoke 8 to the poles 1*a*, 1*b*. It is understood that the soft-magnetic yoke 8 could also be connected to the poles 1*a*, 1*b* in a different way, such as glued. Corresponding bores 12 and/or smaller bores 13 (or bonding instead of the bores 13) are also necessary for the version according to FIG. 1.

A total of four threads 11 are drawn in the cover 9 of the soft-magnetic yoke 8, which are also to be provided in the design according to FIGS. 1 and 3. These are used for screwing on and pretensioning the leaf springs 17 by means of screws 19, see FIG. 3.

The design according to FIG. 3 is similar to that according to FIG. 1, so that only the differences or features that go beyond FIG. 1 are discussed here. FIG. 3 shows how the stationary part and the oscillating part of the signal converter are connected to each other by means of leaf springs 17. This is also to be provided in the embodiments according to FIGS. 1 and 2.

Clearances are to be provided at yoke 8, pole 1*a*, 1*b* and armature 4 in order to establish a connection between armature 4 and leaf springs 17. These clearances are realized by a central bore 12 in FIG. 2, as well as by corresponding two bores next to the pole axis 5 in FIG. 3. In these bores of FIG. 3, one set screw 20, which runs through the entire arrangement and thus through the armature 4 in each case, and two threaded sleeves 22 are inserted, which threaded sleeves 22 run through the cover 8 and a pole 1*a*, 1*b* in each case. The leaf springs 17 are placed on the threaded pins 20 and fastened by means of nuts 21. The threaded pins 20 then also serve to couple the armature 4 to a housing. It is understood that the connection between armature 4 and leaf springs 17 can also be made in other ways.

Yoke 8 and poles 1*a*, 1*b* are bonded in FIG. 3 so that bores 13, as provided in the version according to FIG. 2, are omitted.

Additional masses 16 are arranged in the design according to FIG. 3 radially between the poles 1*a*, 1*b* and the wall 10 of the soft-magnetic yoke 8 and axially between the permanent magnet 3 and the cover 9 of the soft-magnetic yoke 8. Additional masses 16 can also be provided in the embodiments according to FIGS. 1 and 2, e.g. at the positions corresponding to FIG. 3.

The signal converter in question is used in hearing and communication systems as well as for audio diagnostics, the associated bone conduction receiver (osteophone) is worn and used on the human or animal skull. The size of the bone conduction receiver and thus of the signal converter must be dimensioned according to the application. In some embodiment variants of the present signal converter, the latter is very small, in which case its height, measured externally from cover 9 to cover 9 along axis 5, is about 8-10 mm, and the diameter of the soft magnetic element 8, i.e. from the outside of wall 10 to the outside of the opposite wall 10, is 15-25 mm, e.g. 20 mm. The permanent magnet 3 has, for example, an axial height of 2-5 mm, e.g. 3 mm, and a radial dimension of 1-2 mm, e.g. 1.5 mm.

LIST OF REFERENCE NUMERALS

1*a*, 1*b* Pole
2 Coil
3 Permanent magnet
4 Armature
5 Pole axis
6 Pole face of the pole 1*a*, 1*b*
7 Working air gap
8 Soft-magnetic yoke
9 Cover
10 Wall
11 Thread
12 Bore
13 Bore
14 Air gap
15 Lateral surface of the armature 4
16 Additional mass
17 Leaf spring
18 Spacer
19 Screw
20 Set screw
21 Nut
22 Threaded sleeve

The invention claimed is:

1. An electromagnetic signal converter for a bone conduction receiver, comprising at least one soft-magnetic armature which is movable relative to a pole that supports at least one electric coil, at least one permanent magnet for generating a magnetic bias of the armature, as well as at least one soft-magnetic yoke, which forms at least one magnetic circuit together with the at least one permanent magnet, the at least one pole and the at least one armature, wherein at least one first pole and one second pole are provided, each of which carries at least one electric coil, wherein the two poles are identical in design and are arranged symmetrically with respect to one another on a common pole axis, at least one armature is arranged between at least two poles arranged symmetrically with respect to one another, thereby forming in each case an axial working air gap, and is movable along the pole axis relative to the poles, the at least one permanent magnet is magnetized perpendicularly to the pole axis and is arranged radially outside the at least one armature, the lateral surface of the at least one armature facing the at least one permanent magnet forms a radial air gap, via which the armature is magnetically coupled to the permanent magnet, wherein the axial thickness of the permanent magnet is equal to or greater than the axial distance between the two poles, and wherein the at least one armature belongs to a fixed part of the signal converter, while the at least two poles, the at least two coils, the at least one permanent magnet and the at least one soft-magnetic yoke are fixedly connected to one another and form the oscillating mass of the signal converter, relative to the armature.

2. The signal converter according to claim 1, wherein the at least one armature is fixedly connected to a housing surrounding the magnetic circuit.

3. The signal converter according to claim 1, wherein the oscillating mass contains at least one additional mass which is less magnetizable than the poles, the armature or the soft-magnetic yoke.

4. The signal converter according to claim 1, wherein the armature is elastically connected to the oscillating mass via at least one spring.

5. The signal converter according to claim 1, wherein the largest extension of the armature measured radially to the pole axis is larger than the largest extension of the poles measured radially to the pole axis.

6. The signal converter according to claim 1, wherein the armature is plate-shaped at least in the region radially inside the poles.

7. The signal converter according to claim 1, wherein the axial thickness of the armature expands radially outside the poles towards the lateral surface of the armature.

8. The signal converter according to claim 1, wherein the poles are plate-shaped and have a recess for the coil accommodated within the plate thickness.

9. The signal converter according to claim 1, wherein the soft-magnetic yoke has, for each pole, a plate-shaped cover which abuts the pole in the axial direction and covers it in the radial direction, and at least one wall which adjoins the cover, which encloses the poles with coil, the armature and the at least one permanent magnet radially outside and to which the at least one permanent magnet is fastened.

* * * * *